Patented May 7, 1935

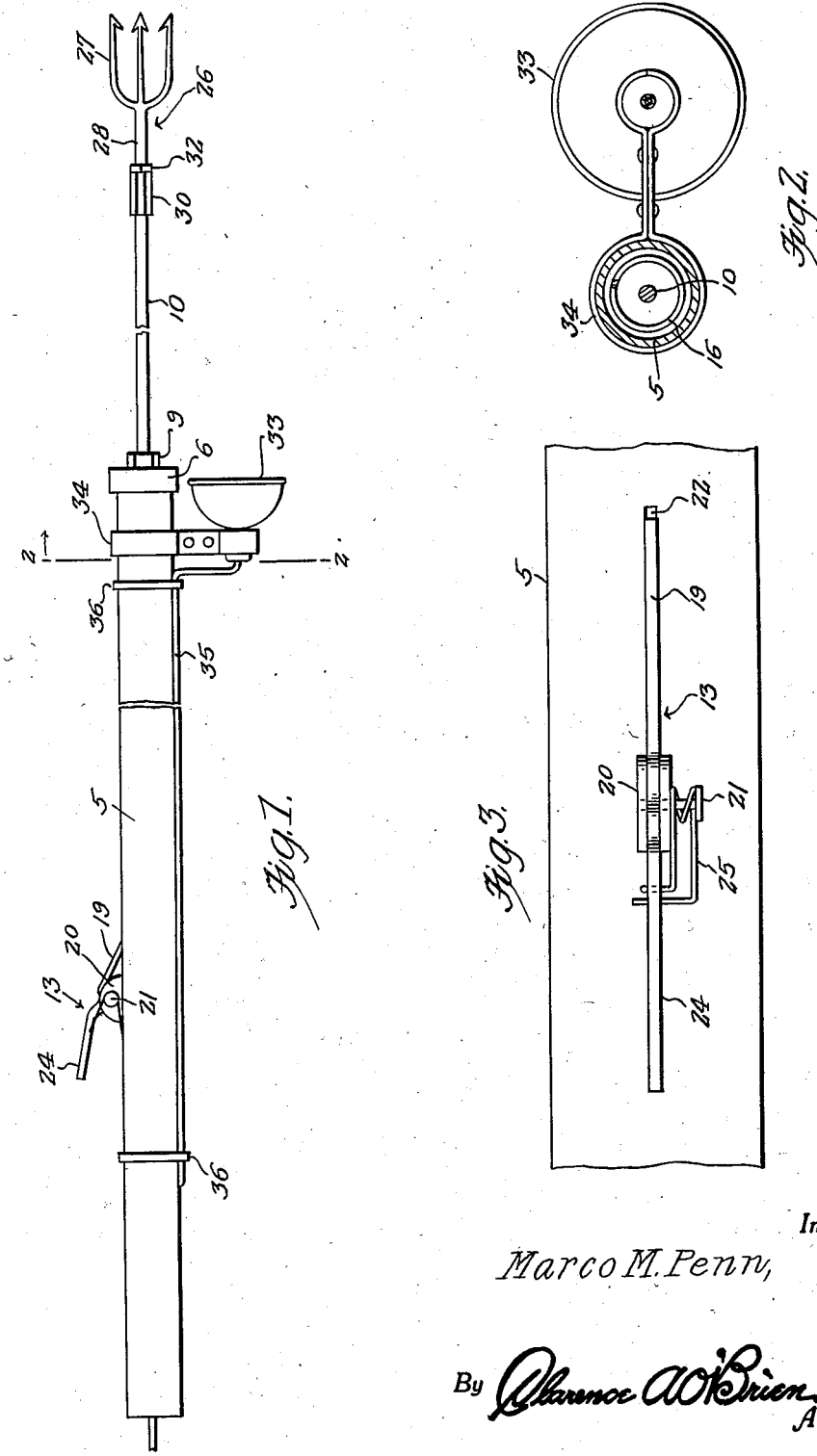

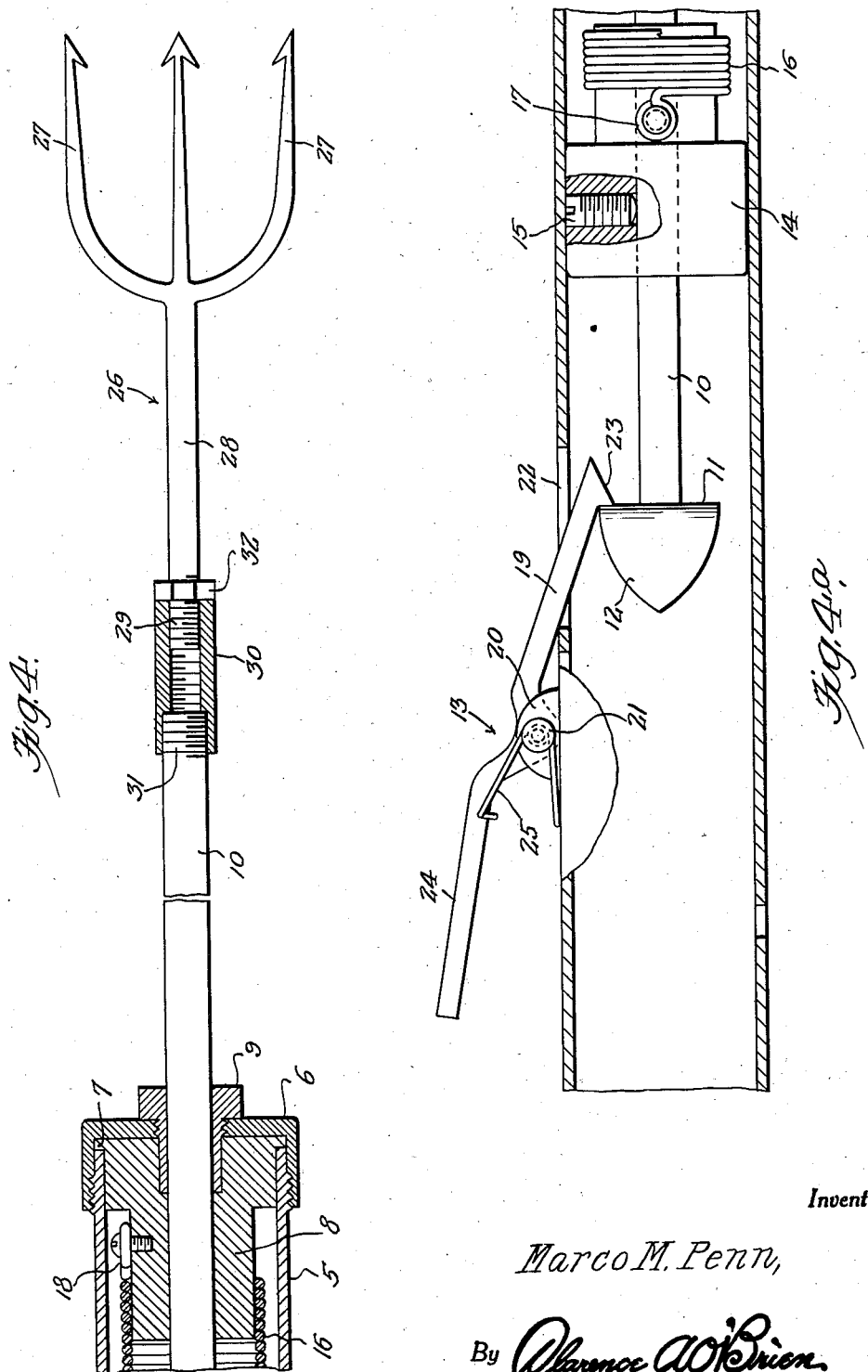

2,000,146

UNITED STATES PATENT OFFICE 2,000,146

AUTOMATIC GIG

Marco M. Penn, Tampa, Fla.

Application September 18, 1933, Serial No. 689,964

1 Claim. (Cl. 43—6)

This invention relates to a fishing and trapping device which may be briefly and aptly entitled an automatic gig, the same being especially designed for the taking of frogs and salt water fish at night.

Briefly described the principal novelty is predicated upon the provision of a longitudinally elongated cylinder or barrel in which a projectable and retractible pronged spear is mounted for reciprocation, spring means being associated with the spear and casing for forcibly projecting the spear in relation to the barrel through the instrumentality of a conveniently located and actuated trigger. In addition the arrangement embodies a battery controlled spotlight carried by the barrel and appropriately located to facilitate finding and stunning the catch.

In reducing the invention to practice I have evolved and produced a simple, economical and expedient assemblage of parts of an easily machinable type and susceptible of expeditious assembly and repair and capable of fulfilling the requirements of the respective function, whereby to provide a sensitive and effective gig.

Other features and advantages will become more readily apparent from the following description and drawings.

In the accompanying drawings, wherein like numerals are employed to designate like parts throughout the views:

Figure 1 is an elevational view of the complete device showing the harpoon-like spear projected to its operative position.

Figure 2 is a cross sectional view taken approximately on the plane of the line 2—2 of Figure 1.

Figure 3 is a fragmentary elevational view detailing the spring retained trigger or latch.

Figure 4 is a view in section end elevation emphasizing the details of construction of the outer end portion of the device.

Figure 4a is a companion view in section end elevation illustrating the trigger, the cam-like keeper head and spring anchoring and guide collar.

Referring now to the drawings by distinguishing reference numerals it will be observed that the casing comprises an elongated hollow tubular cylinder or barrel 5 of appropriate material and proportion. This is preferably closed at its inner end. As shown in Figure 4 the opposite or outer end is externally screw threaded to accommodate a screw threaded cap 6. This cap is clamped against the flanged end 7 of a guide bushing 8 which telescopes into the barrel and which has several functions. The flanged end portion thereof is centrally socketed to receive the sleeve portion of a sleeve-nut 9 and these features 5, 6 and 9 form a guide and packing gland for the reciprocatory plunger rod 10 of the spear. Incidentally the term "spear" is used to describe, as a unit, the entire spring pressed device or unit which is utilized for making the catch.

In Figure 4a it will be observed that the extreme inner end of the plunger rod is formed with a keeper head 11 having cam surfaces 12 for automatically setting the spring retained trigger 13. Adjacent the head is a stabilizing and guiding collar 14 fastened to the rod through the instrumentality of a set screw 15. This collar is constructed to permit one end portion of the coiled spring 16 to be anchored or attached thereto as indicated at 17. The spring surrounds the rod and is completely housed in the barrel, the opposite end portion thereof embraces the bushing 8 and is attached thereto as indicated at 18. The spring is of a contractible type and when put under tension provides the desired thrust action for automatically actuating the spear. The spring is held under tension through the coaction of the keeper head 11 and latch 13. The latch comprises a lever 19 pivoted intermediate its ends on a pair of attaching ears or lugs 20 as indicated at 21. The outer end portion of the trigger or latch extends through a slot 22 into the interior of the cylinder and is provided with a hook 23 which is releasably engageable with the keeper head 11. The free end portion 24 which is disposed on the exterior of the barrel constitutes the trip or finger piece. The numeral 25 merely designates a suitable spring which coacts with the pivot, trigger and ears 21 in normally holding the trigger set for automatic releasable engagement with the keeper head 11 as shown in Figure 4a.

Referring again to the spear unit it will be observed that the spear proper is differentiated by the numeral 26 and comprises a harpoon like implement. It includes a fork having a spur equipped prongs 27 and a shank 28 having a threaded end portion 29 tapped into a union or coupling 30 carried by the threaded end 31 of the plunger rod 10. The numeral 32 merely designates a lock nut for securely connecting the part 26 to the rod 10. Attention is now called in particular to Figure 1 wherein it will be observed that the numeral 33 designates a suitable spot light. This may be of any appropriate construction and it is attached by an appropriate clamp 34 to the outer end portion of the barrel. Current is supplied thereto by way of a waterproof cable 35 which is designed to be connected either with a dry cell battery or a wet battery, appropriate means being provided (not shown) on the cable 35 to permit the connection to be made. The numerals 36 designate clips for fastening the wire to the barrel. The spot light is so positioned as to focus the light rays into the water to facilitate spotting the catch and enables the animal to be stunned, so to speak, to expedite the harpooning result.

The gist of the invention is in the provision of a spring projected spear mounted for reciprocation in a handle forming casing and barrel, together with a trigger and retaining means to facilitate holding the spear in retracted position ready for "shooting". Specifically the novelty is thought to reside in the combined guide and packing glands arrangement shown in Figure 4 and comprising the parts 5, 6, 8 and 9. The reducing coupling 30 together with the features whereby different sized forks may be employed is believed to be ingenious. The stabilizing and guiding collar 14 carried by the rod 10 and serving as an anchor for the spring 16 as shown in Figure 4a is also regarded as an innovation. Then too the keeper head 11 with its cam surface 12 for resetting the trigger automatically and the spring projected trigger 13 affords sensitivity of operation and control. In fact all of these parts have been carefully selected and mechanically coordinated to promote dependability and practicability in operation and use.

A careful consideration of the foregoing description in conjunction with the illustrative drawings will enable the reader to obtain a clear understanding of the purpose, features and advantages, the explicit construction, and the invention as hereinafter claimed.

It is to be understood that minor changes in shape, size, relative proportions, and materials may be resorted to in practice without departing from the spirit of the invention or the scope of the invention as now claimed.

Having thus described my invention, what I claim as new is:

An automatic gig of the class described comprising a longitudinally elongated cylindrical barrel forming a handle and casing, one end of said casing being externally threaded, a guide bushing in said end, a cap screw threaded on said end for securing said bushing therein, a plunger rod mounted for reciprocation in said bushing, a guide collar adjustably mounted on the inner end of said plunger rod, a retractible spring having one end secured to said guide bushing, and the outer end to said guide collar, and trigger means on said barrel cooperable with said plunger rod to hold it in retracted position and to permit it to be automatically projected when released.

MARCO M. PENN.